(No Model.)
W. R. ENGLAND.
PIPE COUPLING.
No. 487,829. Patented Dec. 13, 1892.
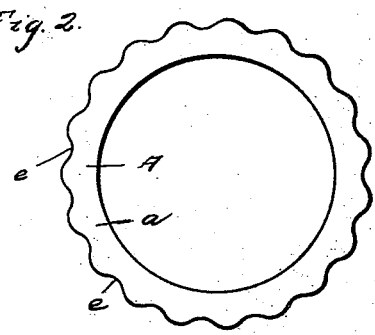
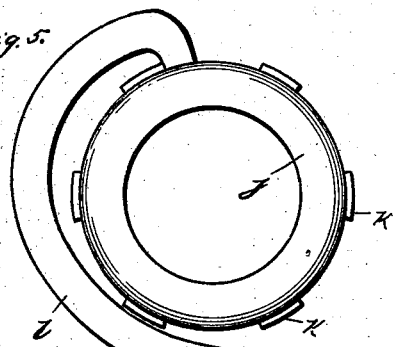
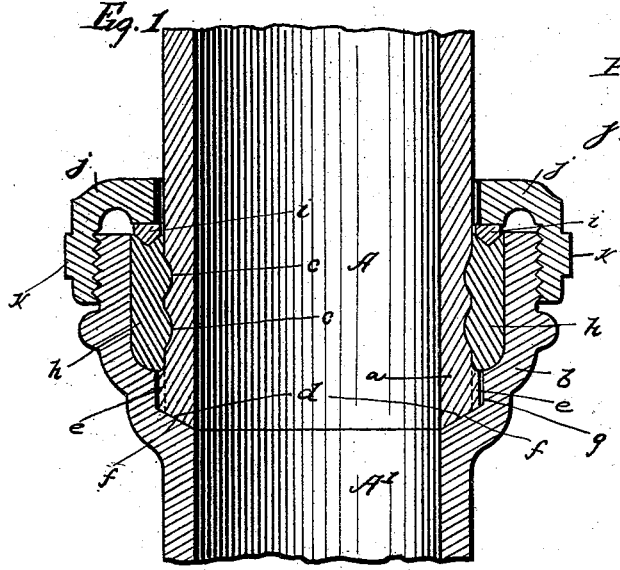
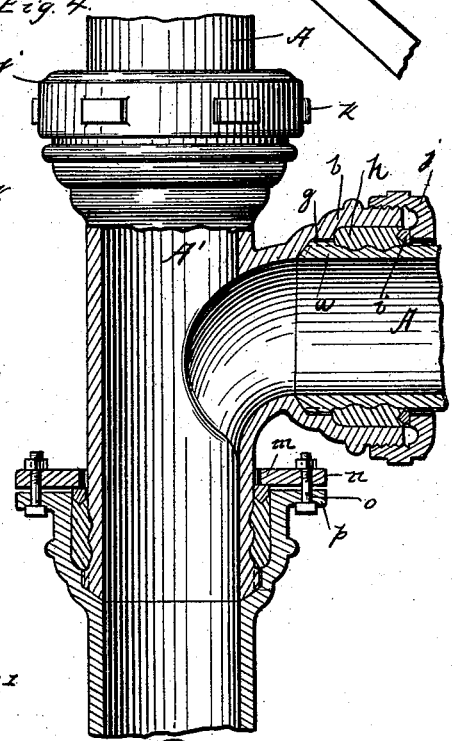
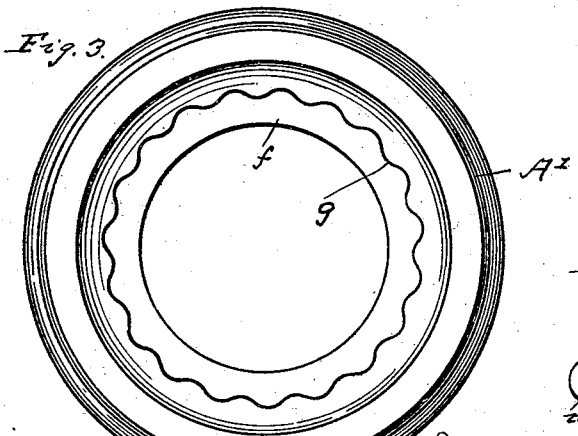
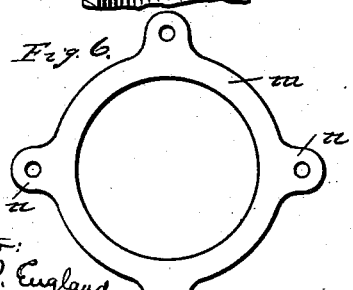
Witnesses:
Rudolph W. Lotz
Wm. Heinemann
Inventor:
William R. England
By Lotz & Kennedy
Attorneys.

UNITED STATES PATENT OFFICE.

WILLIAM R. ENGLAND, OF CHICAGO, ILLINOIS.

PIPE-COUPLING.

SPECIFICATION forming part of Letters Patent No. 487,829, dated December 13, 1892.

Application filed February 12, 1892. Serial No. 421,240. (No model.)

*To all whom it may concern:*

Be it known that I, WILLIAM R. ENGLAND, a citizen of the United States, residing at Chicago, in the county of Cook and State of Illinois, have invented certain new and useful Improvements in Pipe-Couplings; and I do hereby declare the following to be a full, clear, and exact description of the invention, such as will enable others skilled in the art to which it appertains to make and use the same.

This my invention has for its object to provide a coupling device for two sections of the soil or waste pipes in houses that is perfectly hermetic and cannot spring a leak from alternate expansion and contraction, and in which the junction of two pipes will be a close fit interiorly, obviating recesses for putridinous matter to enter; and with these objects in view my invention consists of the novel devices and combinations of devices hereinafter described, and specifically claimed.

In the accompanying drawings, Figure 1 represents a vertical section through the center of my pipe-joint; Fig. 2, an elevation of the spigot end of the upper pipe; Fig. 3, a similar elevation of the bell of the lower pipe; Fig. 4, a sectional elevation of a series of pipes coupled; Fig. 5, a plan of the contracting-nut and its wrench, and Fig. 6 a plan of the contracting-ring of one of the couplings.

Corresponding letters of reference in the several figures of the drawings designate like parts.

A and A' are the ends of two adjoining pipes, the spigot end $a$ of one being inserted into the faucet end $b$ of the other. This spigot $a$ is cast into two (more or less) annular recesses $c$ and has a conical end $d$, and just above this conical end it has cast a longitudinally-corrugated annular projection $e$. This conical end $d$ meets and forms a close joint with the conical bottom $f$ of the faucet $b$ of the other pipe, which also has formed just above said bottom $f$ a longitudinally-corrugated socket $g$, into which the corrugated projection $e$ of the spigot $a$ will fit, when the engagement of the corrugations of both pipes will prevent one from turning in the other, at the same time permitting numerously-changeable relative circumferentially-angular positions of the pipes, as may be required with branch pipes or couplings to such pipes to be on the desired angular direction. Above these corrugations the pipe-bell $b$ provides around the spigot $a$ an annular socket, that is filled with lead $h$, poured therein while in a molten condition, and for the purpose of compacting this lead and hold it from working out by the expansion and contraction of the pipes I place upon the lead filling $h$ a metal ring $i$, having a sharp or wedge-shaped bottom edge and being spilt diametrically for placing it around the pipe, and this ring $i$ I force downward in and upon the lead $h$ by a nut $j$, interiorly screw-threaded and engaging a screw-thread cut exteriorly upon the upper portion of the pipe-bell, and for the purpose of enabling a firm hold on such nut I provide the nut $j$ with a series of projections $k$ for the engagement with a spanner-wrench $l$. This nut $j$ must be placed over the spigot of the pipe before inserting such spigot into the bell of the other pipe. Such pipes, as will be readily seen, can first be placed one in the other until the whole train of pipes, with their branches, is thus put together, and then the joints are made tight by pouring in the lead $h$ and by placing the rings $i$ and drawing the same down upon the lead for compacting the same by nuts $j$, which latter can be close against the wall for turning them with a spanner-wrench, and during this operation the pipes are held from turning by the engagement of the corrugations of the spigots with those of the bells of the several pipes.

In place of nut $j$, I may drive the ring $i$ down upon the lead by a ring $m$, having eyed ears $n$, and by screws or bolts $o$, tapped into or projected through a flange $p$ of faucet $b$ of the pipe; but this construction I do not consider of equal advantage for its purpose, since in many positions it would be difficult to reach screws $o$ for turning the same.

What I claim is—

1. A pipe-coupling consisting of one member provided with a longitudinally-corrugated spigot and another member having an interiorly-longitudinally-corrugated bell, the said corrugated portions of the spigot and bell interfitting with each other, and an annular chamber for packing, substantially as described.

2. A soil or waste pipe provided with a spigot having conical shoulder $d$ and corrugated annular projection e and with a bell having conical shoulder f and corrugated socket g and providing an annular chamber for the lead packing h, substantially as set forth.

3. A soil or waste pipe provided with a spigot having conical end d and corrugated annular projection e and with a bell having conical shoulder f and corrugated socket g and forming an annular chamber for lead packing h around the spigot of a similar pipe inserted therein, and in combination therewith the split ring i and means for forcing such ring upon the lead for compacting and securing the same, substantially as set forth.

4. A soil or waste pipe provided with a spigot having conical end d and corrugated annular projection e and with a bell having conical shoulder f and corrugated socket g and forming an annular chamber for lead packing h around the spigot of a similar pipe inserted therein, and in combination therewith the split ring i and nut j for forcing such ring i upon the lead for compacting and securing the same.

5. A soil or waste pipe provided with a spigot having conical end d and corrugated annular projection e and with a bell having conical shoulder f and corrugated socket g and forming an annular shoulder for lead packing h around the spigot of a similar pipe inserted therein, and in combination therewith the split ring i and nut j, having projections k for forcing such ring i upon the lead for compacting the same by means of a spanner-wrench, substantially as set forth.

In testimony whereof I affix my signature in presence of two witnesses.

WILLIAM R. ENGLAND.

Witnesses:
HARRY COBB KENNEDY,
RUDOLPH N. LOTZ.